March 6, 1951 — K. R. ST. JOHN — 2,543,944
INVENTORY MANIFOLDING ASSEMBLY
Filed June 4, 1949 — 2 Sheets-Sheet 1
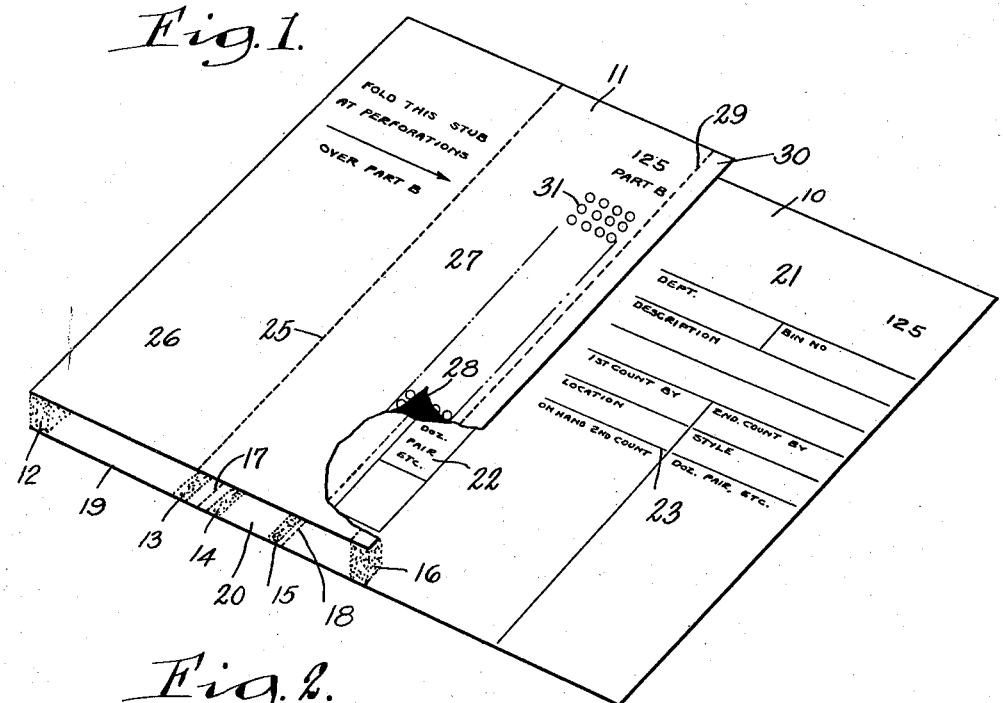
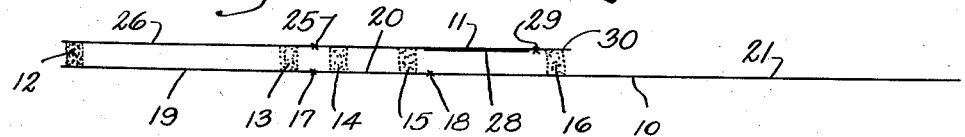
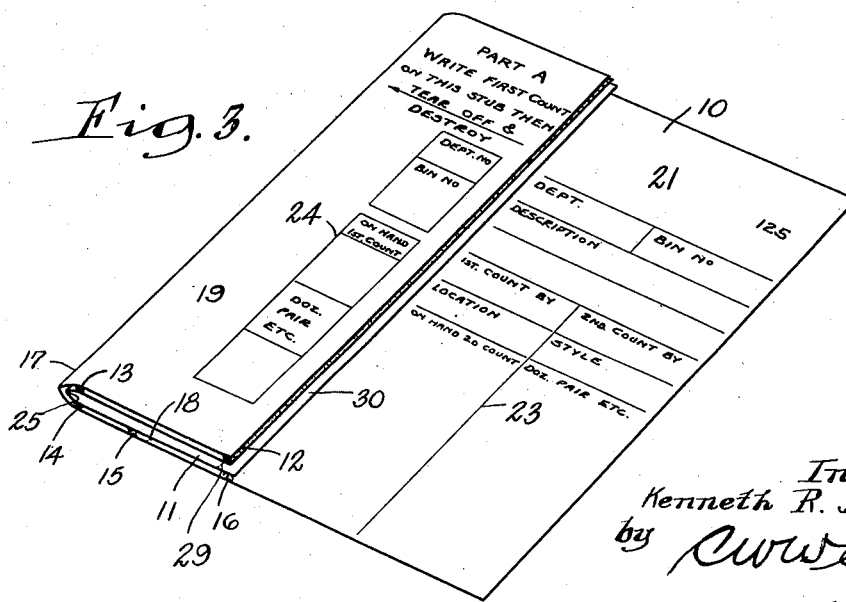
Inventor
Kenneth R. St. John
by C. W. Weeks,
Attorney March 6, 1951      K. R. ST. JOHN      2,543,944
INVENTORY MANIFOLDING ASSEMBLY
Filed June 4, 1949      2 Sheets-Sheet 2
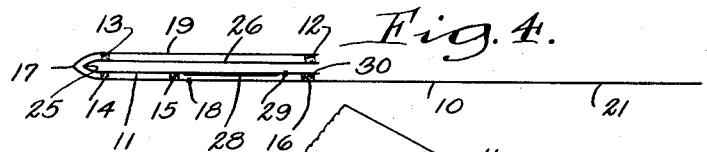
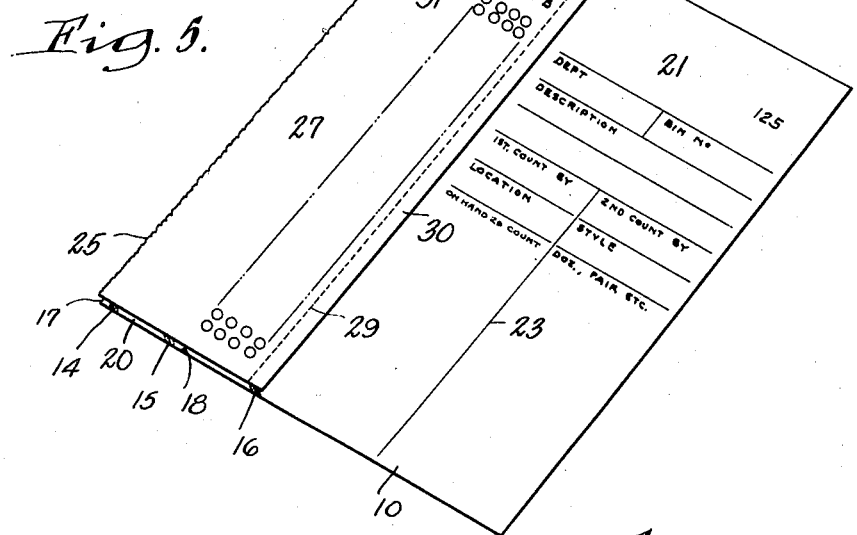
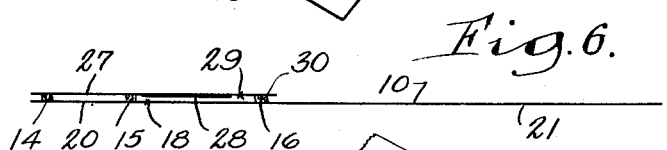
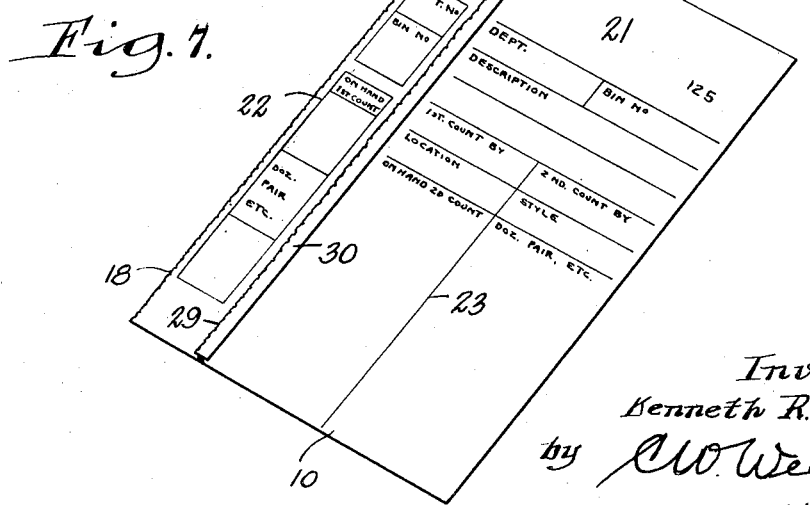
Inventor
Kenneth R. St. John
by C. W. Weeks
Attorney Patented Mar. 6, 1951

2,543,944

UNITED STATES PATENT OFFICE 2,543,944

INVENTORY MANIFOLDING ASSEMBLY

Kenneth R. St. John, Minneapolis, Minn., assignor to Moore Business Forms, Inc., Niagara Falls, N. Y., a corporation of Delaware Application June 4, 1949, Serial No. 97,244

4 Claims. (Cl. 282—23)

This invention relates to improvements in manifolding assemblies of the type employing carbon or transfer material for transferring inscriptions whereby one record can be quickly and easily checked against another record so as to minimize the danger of making errors. More particularly, the invention relates to improvements in manifolding assemblies of this nature for providing a practical and accurate arrangement for checking one inventory count against another which may be made at a different time and by a different person, so as to quickly and easily locate any errors that may have been made in the different counts.

It is a general object of the invention to provide an improved manifolding assembly of the class mentioned whereby the record of one inventory count can be quickly and accurately checked against the record of another count so as to determine any errors that may have been made, and at the same time to devise a construction and arrangement for such an assembly that is simple and practical in operation and inexpensive in production costs.

Another object of the invention is to provide an improved manifolding assembly of the class mentioned requiring but a single record sheet with a carbon sheet attached thereto in a novel manner, so that two separate inventory counts can be recorded on the record sheet without disclosing to the maker of the second count the record made of the first count.

Another object of the invention is to provide in manifolding assemblies of the class mentioned a single record sheet and a single carbon sheet arranged and attached together in an improved manner, whereby the carbon sheet and the record sheet mutually reinforce each other and the carbon sheet conceals a blank form or space on the record sheet for receiving a record of one inventory count made through the medium of the carbon or transfer sheet, from observation by the maker of a second inventory count on a second blank form, and when the transfer sheet is severed from the record sheet the entries of said first named count are displayed alongside of the entries of said second count for comparison purposes so as to locate and determine errors.

Still another object of the invention is to provide an improved manifolding assembly for making inventories having but a single record sheet provided with adjacent blank forms having appropriately designated spaces for receiving entries of separate inventory counts, and a separate transfer sheet attached to the record sheet so as to initially conceal one of the blank forms, the record and transfer sheets being capable of independent manufacture resulting in production economies.

Still another object of the invention is to provide that the record and transfer sheets shall serve as means of mutual alignment in assembling and as means of mutual reinforcement.

Other objects and advantages of the invention are in part pointed out in the following detailed disclosure of an illustrative but preferred embodiment of the invention, and will be in part obvious from the detailed disclosure.

The invention accordingly comprises the features of construction, combination of elements, and arrangement of parts, which will be exemplified in the construction hereinafter set forth and the scope of the application of which will be indicated in the claims.

For a full and complete disclosure of the nature, objects, and advantages of the invention, reference is made to the following detailed description and to the accompanying drawings showing a preferred embodiment of the invention, and in which, Fig. 1 is a perspective partially diagrammatic view, showing a manifolding assembly embodying the invention, the record and transfer sheets being shown as abnormally separated to reveal the structure more clearly.

Fig. 2 is an end view of Fig. 1.

Fig. 3 is a perspective view similar to Fig. 1, showing the record and transfer sheets folded to bring the copy form into overlying position with respect to the record form identical therewith.

Fig. 4 is an end view of Fig. 3.

Fig. 5 is a perspective view showing the assembly after the sections of the record and transfer sheets bearing the copy form and the record form identical therewith are detached along the weakened lines upon which they are foldable following the entries of the inventory counts therein.

Fig. 6 is an end view of Fig. 5; and

Fig. 7 is a perspective view showing the assembly after the transfer sheet and its attached portion of the record sheet have been detached along the weakened severance lines so as to display side by side the entries of the inventory counts on both record forms for comparison purposes.

Referring to the drawing for a detailed description of the illustrative embodiment of the invention there shown, a record sheet 10 of paper or like material is provided having imprinted thereon three blank forms having appropriately designated spaces for entrance of the inventory counts. This record sheet extends across the entire width of the assembly, and a carbon or transfer sheet 11 is attached by an adhesive to the upper surface of the record sheet. The transfer sheet 11 is less in width than the record sheet 10 being positioned over the intermediate and left-hand portions of the record sheet, and as shown preferably extends at its left edge so as to be coterminous with the left edge of the record sheet. The transfer sheet 11 is attached to the upper surface of the record sheet 10 preferably by means of lines or spots of adhesive 12, 13, 14, 15, and 16 appropriately spaced apart as later described more fully. These adhesive attachments are diagrammatically shown in the drawing so that the record and transfer sheets can be shown as being separated to disclose the structure and arrangement more clearly. The adhesive attachments may be of any well-known standard form.

The record sheet 10 is divided into sections by means of lines of perforations 17 and 18, or similar weakened severance lines formed in any well-known manner and extending longitudinally of the record sheet or from top to bottom thereof as shown. The section 19 forming the left hand portion of the record sheet may be folded to overlie the adjacent section as later fully described. The intermediate section 20 of the record sheet remains attached to the transfer sheet by the lines of adhesive 14, 15 after the section 19 has been severed therefrom. The section 21 of the record sheet at the right of the severance line 18 carries the blank forms upon which the inscriptions such as the records of the inventory counts are inscribed. This section 21 carries all the record forms receiving the inscriptions forming the permanent record. The blank form 22 forms the left hand portion of the record section 21 and an intermediate portion of the record sheet 10. The blank form 22 underlies the right hand portion of the carbon sheet 11 in transfer relation so as to be concealed from view thereby. The blank form 23 at the right of the blank form 22 forms the right hand portion of the record sheet 10 and is initially exposed to view, not being overlapped by the carbon sheet. Also, there is another blank form 24 printed on the lower surface of the section 19 which is used for inscribing the data through the medium of the transfer sheet upon the blank form 22, said blank forms 22 and 24 being identical. Blank form 24 is temporarily used as a pattern or copy for making the concealed inscription upon blank form 22 and is then discarded by severing the section 19 along weakened line 18. The blank forms 22, 23, 24 have appropriately designated spaces for entrance of the inventory counts, as later described. The other forms at the top of the record section 21 are for the reception of miscellaneous identifying data.

It will be observed that the right hand portion of the transfer sheet 11 overlaps the blank form 22 of the main record section 21 so as to initially conceal from view this blank form 22 and any data inscribed thereon. Also, the transfer sheet 11 extends all the way to the left edge of the underlying record sheet 10 so as to be coterminous therewith at the left edge of the assembly. Also, the transfer sheet is provided with a weakened severance line 25 similar to the severance line 17 of the record sheet and overlying and substantially aligned with the same. The severance line 25 extends all the way across the transfer sheet thus forming a section 26 having the same dimensions as those of and overlying the section 19 of the record sheet and permanently attached thereto by the lines of adhesive 12, 13. The section 27 at the right of the severance line 25 forms the transfer sheet proper and is provided on its lower surface with a carbon coating 28 positioned to overlie and to transfer inscriptions to the blank form 22 of the record sheet. This carbon coating need be only of sufficient extent so as to transfer the inscriptions to any part of the underlying blank form 22. The transfer sheet 11 is also provided with a second weakened severance line 29 spaced from the severance line 25 and extending along the right hand marginal portion of the transfer sheet to form a binding stub 30 by means of which the transfer sheet is attached to the record sheet by the line of adhesive 16. It will thus be noted that the severance line 29 of the transfer sheet lies just to the right of the concealed blank form 22 while the severance line 18 of the record sheet lies just to the left of this blank form. The area of the transfer sheet section 27 overlying the concealed blank form 22 may be provided with blank copy 31, such as printed circles or dots as shown, or otherwise treated so as to avoid any possibility of any legible record being made upon the upper surface of section 27 when the inscriptions are made upon the blank form 24 and transferred by the carbon coating thereof to the underlying blank form 22.

Thus the record sheet 10 has imprinted thereon a record form 23 located upon the upper face of the right hand portion of said sheet, a copy form 24 located upon the lower face of the left hand portion of said sheet and a second record form 22 located upon the upper face of the intermediate portion of said sheet adjacent said first named record form, said copy form and said second record form being identical. Thus also the transfer sheet 11 overlies and is of the same dimensions as those of said intermediate and left hand portions of the record sheet so that the record and transfer sheets serve as means of mutual alignment in assembling and as means of mutual reinforcement.

In view of the foregoing description, it will now be clear how the improved manifolding assembly may be advantageously used in actual practice. Suppose, for example, it is desired to make inventory counts of merchandise or the like, by different parties and to conceal the record of the first count from the maker of the second count, and later to check the record of the first count against that of the second count. To do this, the sections 19, 26 of the assembly are folded over on the weakened lines 17, 25 to the position shown in Fig. 3, in which the blank form 24 overlies and is aligned with the blank form 22. The maker of the first count then records the inventory data upon the blank form 24 which data is transferred by the transfer sheet to the concealed blank form 22. The sections 19, 26 are then severed from the assembly along the weakened severance lines 17, 25 and destroyed or secreted. The remaining assembly thus assumes the form shown in Fig. 5, on which no record of the first inventory count is visible and no trace of it can be seen on the blank copy 31. The maker of the second inventory count receives the assembly in this condition and records the results of his count on the exposed blank form 23 of the main record section 21. Thus the maker of the second count cannot be influenced in any way by the record of the first count.

The assembly with the record of the two independent counts thus made is then delivered to the Accounting or Auditing Department, and the assembly is severed along the weakened severance line 18 of the record sheet and the weakened severance line 29 of the transfer sheet. This severance can be quickly and easily accomplished at a single severing operation, thus exposing the record made on blank form 22 along side of the record made on blank form 23. The record sheet thus assumes the form shown in Fig. 7, the transfer sheet having been entirely removed with the exception of the binding stub 30. The records of the results of the two inventory counts are thus displayed side by side in the two record forms 22 and 23 and if any errors occur, they may be quickly and easily located.

It will be observed that the records of the two inventory counts are made on a single integral record sheet which extends continuously from one lateral edge of the assembly to the opposite lateral edge, and that only a single record sheet is necessary. Also, it will be noted that it is unnecessary to record any data upon the transfer sheet serving only a transfer function. The transfer sheet is therefore not used for recording data thereon, and may be made of a different quality of paper from the record sheet 10. Also, the transfer sheet 11 overlaps and is secured to the record sheet section 19, thus serving as a reinforcement therefor and for the weakened severance line 17 of the record sheet. Since the transfer sheet 11 extends at its left edge to the adjacent edge of the record sheet, it provides a very convenient means in aligning and positioning the record and transfer sheets in correct position with reference to each other during the initial assembly of the sheets. Thus advantages in production costs are attained.

Since certain changes may be made in the above construction and different embodiments of the invention could be made without departing from the scope thereof, it is intended that all matter contained in the above description or shown in the accompanying drawing shall be interpreted as illustrative and not in a limiting sense.

The invention having thus been fully described, the following is claimed:

1. In an inventory manifolding assembly for checking entries of inventory counts against one another, in combination, a single integral record sheet having imprinted thereon three forms having appropriately designated spaces for receiving said entries, namely a record form located upon the upper face of the right hand portion of said sheet, a copy form located upon the lower face of the left hand portion of said sheet and a second record form located upon the upper face of an intermediate portion of said sheet adjacent said first named record form, said copy form and said second record form being identical, and a transfer sheet overlying and concealing said second record form from view, said transfer sheet being secured to said record sheet adjacent the opposite longitudinal edges of said second record form, said record sheet having a weakened severance line upon which it is foldable to bring said copy form into overlying position with respect to said transfer sheet and said second record form so that entries of inventory counts made upon said copy form will also be made upon said second record form through the medium of said transfer sheet, entries of inventory counts thus made upon said second record form being concealed from the view of the person making entries upon said first named record form, removal of said transfer sheet rendering visible side by side the entries of inventory counts made upon both record forms for comparison purposes.

2. In an inventory manifolding assembly for checking entries of inventory counts against one another, in combination, a single integral record sheet having imprinted thereon three forms having appropriately designated spaces for receiving said entries, namely a record form located upon the upper face of the right hand portion of said sheet, a copy form located upon the lower face of the left hand portion of said sheet and a second record form located upon the upper face of the intermediate portion of said sheet adjacent said first named record form, said copy form and said second record form being identical, and a transfer sheet overlying and concealing said second record form from view, said transfer sheet being secured to said record sheet adjacent the opposite longitudinal edges of said second record form, said record sheet having a weakened severance line upon which it is foldable to bring said copy form into overlying position with respect to said transfer sheet and said second record form so that entries of inventory counts made upon said copy form will also be made upon said second record form through the medium of said transfer sheet, said record and transfer sheets having weakened severance lines located adjacent the opposite longitudinal edges of said second record form for severance of the transfer sheet and its attached portion of the record sheet from and to render visible side by side the entries made upon both record forms.

3. In an inventory manifolding assembly for checking entries of inventory counts against one another, in combination, a single integral record sheet having imprinted thereon three forms having appropriately designated spaces for receiving said entries, namely a record form located upon the upper face of the right hand portion of said sheet, a copy form located upon the lower face of the left hand portion of said sheet and a second record form located upon the upper face of the intermediate portion of said sheet adjacent said first named record form, said copy form and said second record form being identical, and a transfer sheet overlying and of the same dimensions as those of said intermediate and left hand portions of said record sheet concealing said second record form from view, said transfer sheet being secured to said record sheet adjacent the opposite longitudinal edges of said second record form, said record and transfer sheets having weakened severance lines upon which they are foldable to bring said copy form into overlying position with respect to said transfer sheet and said second record form so that entries of inventory counts made upon said copy form will also be made upon said second record form through the medium of said transfer sheet, said transfer and record sheets having weakened lines located adjacent the opposite longitudinal edges of said second record form for severance of the transfer sheet and its attached portion of the record sheet from and to render visible side by side the entries made upon both record forms, the record and transfer sheets serving as means of mutual alignment in assembling and as means of mutual reinforcement.

4. In an inventory manifolding assembly for checking entries of inventory counts against one another, in combination, a single integral record sheet having imprinted thereon three forms having appropriately designated spaces for receiving said entries, namely a record form located upon the upper face of the right hand portion of said sheet, a copy form located upon the lower face of the left hand portion of said sheet and a second record form located upon the upper face of the intermediate portion of said sheet adjacent said first named record form, said copy form and said second record form being identical, and a transfer sheet overlying and of the same dimensions as those of said intermediate and left hand portions of said record sheet concealing said second record form from view, said transfer sheet being secured to said record sheet adjacent the opposite longitudinal edges of said second record form, said record and transfer sheets having weakened severance lines upon which they are foldable to bring said copy form into overlying position with respect to said transfer sheet and said second record form so that entries of inventory counts made upon said copy form will also be made upon said second record form through the medium of said transfer sheet, said transfer sheet being also secured to said record sheet adjacent to and upon both sides of its fold line and adjacent its left hand longitudinal edge, said transfer and record sheets having weakened lines located adjacent the opposite longitudinal edges of said second record form for severance of the transfer sheet and its attached portion of the record sheet from and to render visible side by side the entries made upon both record sheets, the transfer and record sheets serving as means of mutual alignment in assembling and as means of mutual reinforcement.

KENNETH R. ST. JOHN.

REFERENCES CITED

The following references are of record in the file of this patent:

UNITED STATES PATENTS

| Number | Name | Date |
|---|---|---|
| 1,508,095 | Fuller | Sept. 9, 1924 |
| 1,512,685 | Groby | Oct. 21, 1924 |
| 2,448,143 | Gilbert | Aug. 21, 1948 |